Oct. 22, 1957 D. H. STRONG 2,810,314
GEAR LOADING DEVICE
Filed March 30, 1956

INVENTOR.
DAVID H STRONG
BY
ATTORNEYS

United States Patent Office

2,810,314
Patented Oct. 22, 1957

2,810,314

GEAR LOADING DEVICE

David H. Strong, Mount Vernon, Iowa, assignor to Collins Radio Company, Cedar Rapids, Iowa, a corporation of Iowa Application March 30, 1956, Serial No. 575,163

3 Claims. (Cl. 81—90)

This invention relates in general to a hand tool and more particularly to a hand tool used in adjusting the loading of split gears.

Previous to this invention, methods for loading split gears were mainly digital and were limited by the skill of the person assembling the split gears. Usually, a pair of screw drivers would be used to hold the gears and to rotate one relative to the other to load the springs. As a consequence, the amount of spring pressure involved varied widely between operators and between installations by the same operator. Previous methods of assembly, therefore, were unsatisfactory.

Accordingly, it is an object of the invention to provide a tool which will permit adjustment of the loading pressure of split gears.

Further, it is an object of this invention to provide a tool which permits uniformity of spring loading pressure independently of the operator's skill or physical condition.

It is a feature of this device that split spring loaded gears are held by the tool and the spring loading adjusted by a finger knob.

It is a further feature of this invention that the tool is useful for assembly or disassembly of spring loaded gearing.

Further objects, features, and advantages of the invention will become apparent from the following description and claims when read in conjunction with the drawing, in which:

Figure 1:
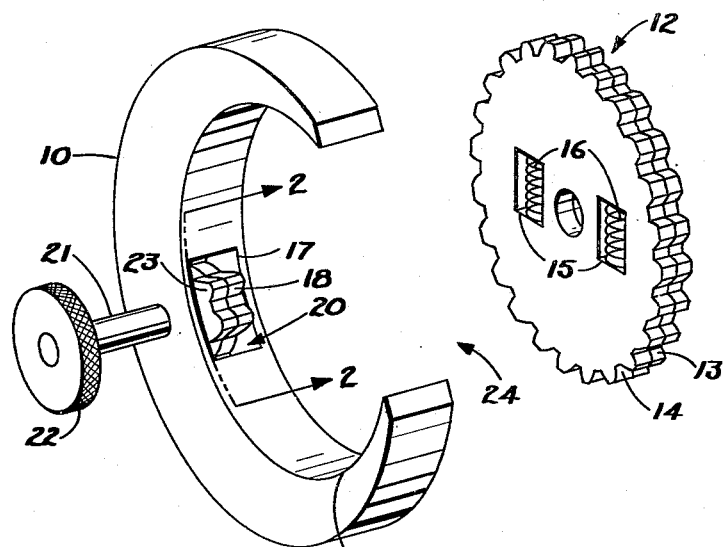
Figure 1 shows a perspective view of the tool with a typical split gear.

In Figure 1 a C-shaped frame member 10 is provided with an internal bore 11 equal to the over-all diameter of the gear set operated on. The cooperative gear operated on is split gear 12, composed of two similar gears 13 and 14, each having an aligned pair of slots 15. In each of the aligned slots are compression springs 16. The construction of split gear 12 shown here is typical and is presented thus to illustrate more clearly the invention.

Frame 10 has a shape approximating that of the letter C. In the midportion of the C is a cavity 20 with an opening 17 communicating with the bight of the C. A fixed spur gear 18 extends out of opening 17 sufficiently to expose its teeth for meshing with one of the split gears 13. Mounted transversely to the frame 10 and extending into the cavity 20 is a shaft 21. Shaft 21 is rotatably supported by a bearing in the frame and carries fixed to it an external finger knob 22. Finger knob 22 has a knurled surface thereon to provide a non-slip surface for the fingers.

Also fixed to shaft 21, but within cavity 20 is a spur gear 23. Gear 23 projects from cavity 20 similarly to spur gear 18. Spur gears 23 and 18 are paired, like gears 13 and 14 of split gear 12, with similar characteristics. The gear tooth characteristics of spur gears 23 and 18 are the same as those of the gear teeth on gears 13 and 14. The widths of gears 18 and 23 are consonant with the widths of the matching split gears. Gear 18 matches and engages gear 13 holding it fast, and gear 23 matches and engages gear 14 and moves it as controlled by the knob.

The opening of the C, 24, is made great enough to permit engagement of split gear 12 with some other gear in the gear-train which is being assembled. The thickness of the frame 10 is sufficient to give the C rigidity to hold split gear 12 against the spur gears during the spring loading operation. The width of the frame member along the axis of the adjusting shaft 21 is at least slightly greater than the spur gears 18 and 23 although a width equal to the spur gears may be used where thinness is necessary in the installation of the split gear.

A detent is used in the body of the C to prevent undesired rotation of spur gear 23. This detent is not visible in Figure 1 but is shown in the sectional view of Figure 2.

Figure 2:
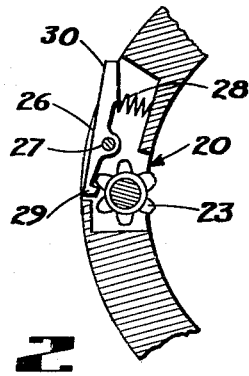
Figure 2 shows a section along line 2—2 in Figure 1 showing the details of the detent.

In Figure 2 cavity 20 is shown containing therein gear 23. On the back side of the C communicating with the outside of the C, a pawl 26 is mounted on a pivot 27, urged against gear 23 by a compression spring 28. One end of pawl 26 is shaped similarly to a tooth at 29 to engage gear 23, to prevent rotation of gear 23 under the spring forces of the split gear. Spring 28 is adjusted to have a compression light enough to permit manual rotation, but heavy enough to prevent pawl 26 from slipping or camming out despite the shape of tip 29 under the forces of the loaded gears. A portion at the other end 30 of the pawl 26 is raised above the surface of the frame to permit finger-tip release of the detent.

In operation, assembled split gear 12 is inserted into the bore 11 of the C, with the gears of the split gear aligned and under no pressure from springs 16. Gear 13 is engaged with fixed gear 18 while gear 14 is engaged with movable gear 23. The split gear 12 is substantially parallel to the plane of the C and held completely within said C. Spur gear 23 is then rotated by digital control of knob 22. This rotation rotates gear 14 relative to gear 13 producing some compression of springs 16. Gear 14 is thus rotated until the desired loading is applied to the split gear 12. As spur gear 23 is rotated pawl 26 ratchets along and when the desired loading is achieved, tooth 29 drops in between teeth of spur gear 23 and holds against counter rotation.

Split gear 12 is now loaded. The gear is assembled on its shaft in engagement with a solid gear having a width equal to the width of gears 13 plus 14. Portion 30 is then pressed, releasing the pawl, and also the pressure on gear 23. Then, by means of shaft 21 and knob 22, the tool is removed from around split gear 12. Split gear 12 now is in position and adjusted to the desired spring loading.

Removal of split gear 12 from equipment is merely the reverse of the above steps. It is obvious that removal which otherwise is difficult now becomes a simple operation.

The tool may be made of any materials desired having the necessary strength. Frame 10 may be made of metal or plastics, may be machined or cast etc. A single tooth or other substitutions may be used in place of spur gear 18. Spur gear 23 may be similarly made of rigid plastics or metal. It may be made integrally with shaft 21 or separately as desired. The opening 24 is made of any shape as dictated by the application of the tool to the size gears involved. The only requirement is that the arc of the C of frame 10 be somewhat greater than 180° to retain split gear 12 during the loading operation. The spring loaded pawl 26 may take other forms common in the detent art, without departure from the spirit of the invention.

Likewise, any type of bearing may be used for shaft 21 in the body of the frame 10. Where the spring loading forces become extremely high it may be advantageous to use anti-friction bearings such as ball bearings.

Although this invention has been described with respect to particular embodiments thereof, it is not to be so limited because changes and modifications may be made therein which are within the full intended scope of the invention as defined by the appended claims.

I claim:

1. A split-gear loading tool comprising a C-shaped frame, means fastened thereto for holding fixed one of a pair of split gears, and digital means mounted in said frame for rotating the other of said pair of split gears relative to said one split gear.

2. A split-gear loading adjusting tool comprising a frame enclosing somewhat more than one-half the circumference of split gears, means mounted in said frame for engaging fixedly one of said split gears, detented movable means mounted adjacent said fixed means for moving the other of said split gears, and means coupled to said movable means for digitally moving said movable means.

3. A split-gear loading tool comprising a C-shaped frame having a first detent means for one of said split gears and having a gear means engageable with the other of said split gears, a shaft mounted in said frame carrying said gear means, a finger knob on said shaft external to said frame, and a second detent means engaging said gear means to prevent undesired rotation thereof by said spring loaded split gear.

References Cited in the file of this patent

UNITED STATES PATENTS

| | | |
|---|---|---|
| 2,467,827 | Hinton | Apr. 19, 1949 |
| 2,475,606 | Gagnan | July 12, 1949 |
| 2,541,772 | Lockard | Feb. 13, 1951 |